Figure 1:
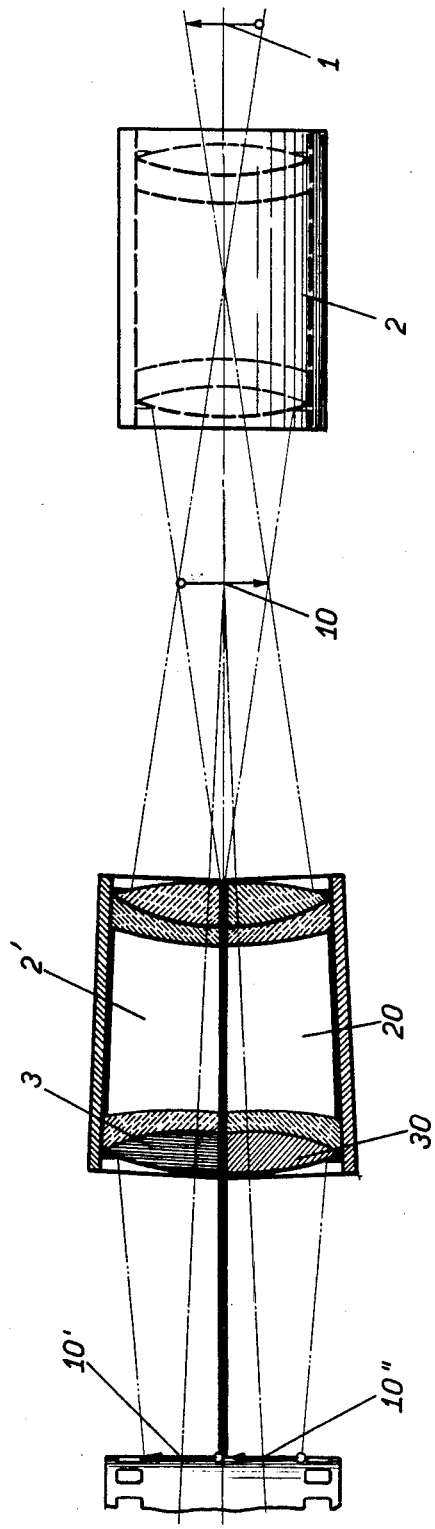

June 11, 1935.  W. A. KOSKEN  2,004,442
ADDITIVE FIXED FILTER COLOR SYSTEM
Filed Aug. 29, 1931   3 Sheets-Sheet 2
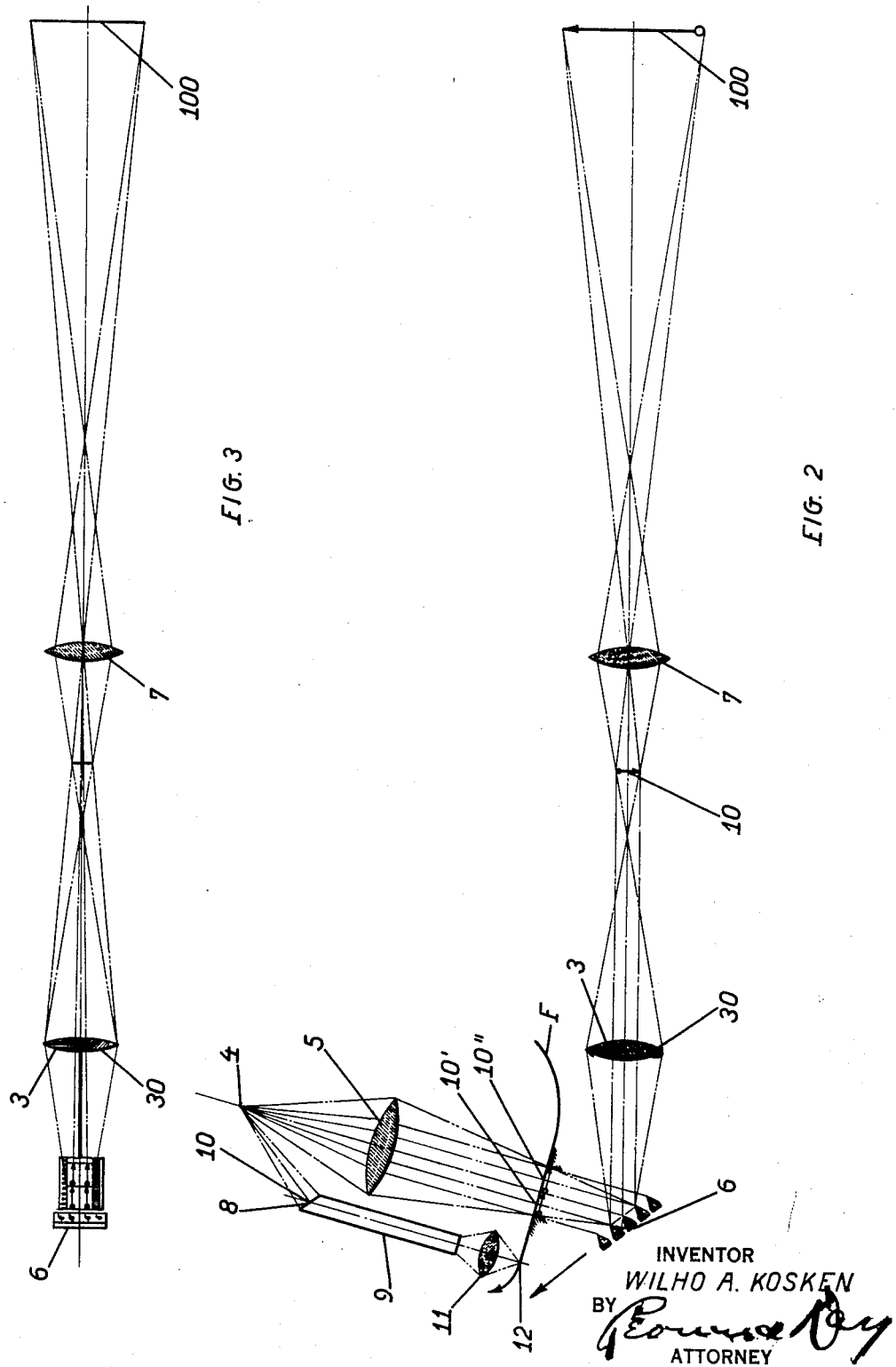
INVENTOR
WILHO A. KOSKEN
BY
ATTORNEY June 11, 1935.  W. A. KOSKEN  2,004,442
ADDITIVE FIXED FILTER COLOR SYSTEM
Filed Aug. 29, 1931  3 Sheets-Sheet 3
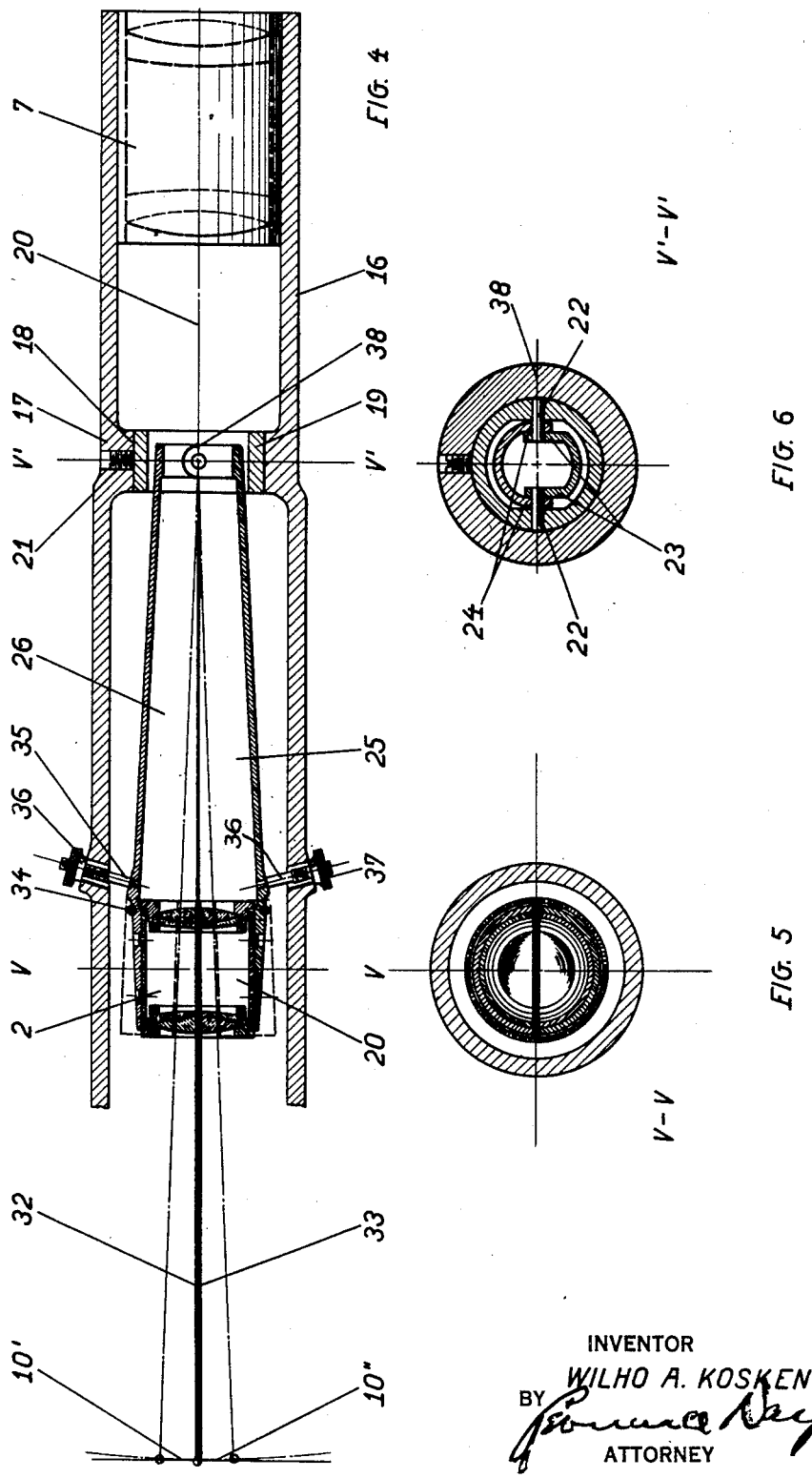
INVENTOR
WILHO A. KOSKEN
BY
ATTORNEY Patented June 11, 1935

2,004,442

UNITED STATES PATENT OFFICE 2,004,442

ADDITIVE FIXED FILTER COLOR SYSTEM

Wilho A. Kosken, New York, N. Y., assignor to Wilho A. Kosken, Inc., a corporation of New York Application August 29, 1931, Serial No. 560,111

4 Claims. (Cl. 88—1)

This invention relates to combining lens systems useful in cameras and in projectors and cooperative between a secondary image and two separate images. In the case of the camera, the secondary image produced by an objective lens from an object is reproduced as two separate images and preferably as two separate images in accordance with the green color values of the object for the one lens part and in accordance with the red color value of the object for the other lens part and the respective reproduced images. In the case of the projector, two separate black and white images from which white light is projected are combined preferably in their respective green and red values into one intermediate image in natural color which is then projected onto a screen.

My invention relates generally also to projector apparatus and systems such as those described in my copending applications for Prism carrier for projection machines, Serial No. 403,491, filed October 30, 1929 now patent 1,903,820; Continuous projector with slow speed deflectors, Serial No. 436,562, filed March 17, 1930; Continuous projector for natural color projection, Serial No. 436,563, filed March 17, 1930.

The object of this invention is to make possible the adjustment of the separation of the two separate images without upsetting the focal adjustment of the combining lens systems. When motion pictures are being taken of natural objects upon a film, this is of some importance, but not nearly of the importance in connection with the projection of pictures from a film. In projecting pictures, it has been found that shrinkage and substance expansion of the film have been such as to change the proper positioning of the two separate images which are to be projected simultaneously and are to be combined. By the practice of my invention the combining lens system may be adjusted simply and readily to accord with any commercial alteration of the positioning of the images on the film.

The above and further objects of the invention will be pointed out more in detail in the following claims which are directed to illustrative embodiments of the invention described in the following specification in connection with the accompanying drawings which form a part hereof. The embodiments to which the claims are directed are for purposes of illustration and not limitation.

Referring now more in detail to the drawings, Fig. 1 is a diagrammatic camera layout of my lens system; Fig. 2 is a diagrammatic layout of my projector lens system shown in horizontal section: Fig. 3 is a showing of the system of Fig. 2 in vertical section along the major light axis; Fig. 4 is a vertical detail section through the combining lens housing; Fig. 5 is a cross-section through the plane of line V—V of Fig. 4; and Fig. 6 is a cross-section through the swiveling ring taken along the plane of line VI—VI of Fig. 4.

In the camera system of Fig. 1, a natural object 1 is reproduced by the objective lens system 2 as an intermediate or secondary image 10. This image 10 in turn is reproduced by the combining lens system 2' as the separate image 10' and by the comining lens system 20 as the separate image 10". It is preferred that a part of the combining lens system 2', such as the lens structure 3, include color filtering medium red and that the cooperative lens part 30 include color filtering medium green so that the respective separate images 10' and 10" are black and white records, the first of the red color values of the object 1 and the second of the green color values of the object 1.

In my projector system a source of light 4 cooperating with the condenser lens 5 passes through the two images 10' and 10" on film F and through the medium of the compensating deflectors through the combining lenses 3 and 30 to produce a combined secondary image 10 which is projected by means of the projector lens 7 to form the usual screen projection 100. In connection with this projector, the original source of light 4 shines upon the flat end 8 of a quartz rod 9. A slit 10 is formed in the painted or silvered surface 8 and is interiorly reflected through the quartz rod into cooperation with the reduction lens 11 which forms a reduced image 12 along the sound track of the film F in the form of a practically narrow light line.

In order to attain the adjustment objects of the invention, it is preferred that the projector lens system 7 and the combining lens systems be mounted in a tubular housing 16 of any suitable metal. In this housing is a throat 17 providing a cylindrical wall 18 in which an adjustable ring 19 slidably fits and permits rotatable adjustment and adjustment along the axis 20 to be fixed in position by the set screw 21. This ring 19 mounts the hinge pins 22 to hinge the lips 23 and 24 of the combining lens carriers 25 and 26. The axis of these hinge pins is in the plane of the secondary or intermediate image 10 and the length of the combining lens carriers to the position at which the respective lens systems 2 and 20 are mounted corresponds to the focal length of these lenses. Each of these lens systems 2 and 20 physically must comprise only a part such as a half of the ordinary disk shaped lens, the two halves being held fast in their respective half barrels or ring holders by the halves of the lens system 2, by the plate 32 and the halves of the lens system 20 by the plate 33. These plates may be soldered to the terminal edges of the lens mounts and their extensions to the left in Fig. 4 serve as separators or spacers for the respective image beams. Of course, the greater the separation of the images 10' and 10'', the greater the size of the part of the lens—up to whole disks.

The lens carriers are somewhat in the form of half tapered tubes and their left hand ends are normally forced towards each other by an encircling spiral spring 34. Threaded pins 35 and 36 extend through the housing 16 through enlarged holes and their externally threaded stems are adjustable by thumb nuts 36' and 37 so as to cause a separation between the lens halves 2 and 20 swiveling about the axis 38 or to cause a combined swiveling about this axis without a separation. In this way, the position of the images 10' and 10'' with respect to separation to accord with film condition may be effected readily without destroying the focal length between the axis 38 and the combining lens systems 2 and 20.

What I claim and desire to secure by United States Letters Patent is:

1. In combination in a lens system for combining two separate images into two coincident secondary images, a cooperative pair of relatively movable lens carriers; hinging means for hinging both of said lens carriers in the plane of said secondary image and for mounting said pair of lenses at their focal length from said plane; and means for adjusting said lens carriers.

2. The combination as characterized in claim 1 and further characterized by the fact that means is provided for adjusting the position of said axis substantially along the axis of said lens system; a combining lens system for cooperating between two separate images and a secondary image comprising two combining lens systems, each focusing at said secondary image and each respectively upon a separate image locality; means for swiveling said combining lens systems about the same axis in the plane of said secondary image for adjusting the relative position of said separate images.

3. The combination as characterized in claim 1 and further characterized by the fact that the means for hinging both of said lens carriers is external to the passage for the light beams, and leaves the central locality at the axis of hinging open and unobstructed.

4. In combination in a lens system for combining two separate images into two coincident images, two fractional portions of a lens; a cooperative pair of relatively movable lens carriers each mounting one of said lens portions; hinging means for hinging both of said lens carriers in the plane of said secondary image; and means for adjusting said lens carriers.

WILHO A. KOSKEN.